US009661288B2

(12) United States Patent
Ohno (10) Patent No.: US 9,661,288 B2
(45) Date of Patent: May 23, 2017

(54) PROJECTION DISPLAY SYSTEM, AND REMOTE CONTROLLER FOR CONTROLLING PROJECTOR

(71) Applicant: Kouji Ohno, Chiba (JP)

(72) Inventor: Kouji Ohno, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/949,052

(22) Filed: Nov. 23, 2015

(65) Prior Publication Data
US 2016/0173843 A1 Jun. 16, 2016

(30) Foreign Application Priority Data

Dec. 10, 2014 (JP) .................. 2014-250380

(51) Int. Cl.
*H04N 9/31* (2006.01)
*G03B 21/14* (2006.01)
(Continued)

(52) U.S. Cl.
CPC ......... *H04N 9/3194* (2013.01); *G03B 21/145* (2013.01); *H04N 5/4403* (2013.01);
(Continued)

(58) Field of Classification Search
USPC ..... 348/734, 725, 744, 745; 353/69, 70, 101
See application file for complete search history.

(56) References Cited

U.S. PATENT DOCUMENTS 5,806,020 A * 9/1998 Zykan .................. G01C 15/002
    250/201.6
6,152,238 A * 11/2000 Ferrell .................... E02F 3/847
    172/2
(Continued)

FOREIGN PATENT DOCUMENTS

CN   1645242 A   7/2005
CN   1787605 A   6/2006
(Continued)

OTHER PUBLICATIONS

Extended European Search Report dated Feb. 29, 2016 issued in corresponding European Application No. 15196839.3.
(Continued)

*Primary Examiner* — Paulos M Natnael
(74) *Attorney, Agent, or Firm* — Harness, Dickey & Pierce, P.L.C.

(57) ABSTRACT

A projection display system includes a projector to project an image onto a projection surface, and a remote controller to control the projector. The remote controller includes a first sensor to measure a current value of horizontal distance to the projection surface, a second sensor to measure a current value of vertical distance to the projection surface, and a processor to obtain, from a memory, preset values of horizontal distance and vertical distance corresponding to a screen size selected by a user, and to control a display to display a screen including the obtained preset values of horizontal distance and vertical distance, the current value of horizontal distance measured by the first sensor, and the current value of vertical distance measured by the second sensor.

15 Claims, 5 Drawing Sheets

(51) Int. Cl.
*H04N 5/44* (2011.01)
*G03B 21/00* (2006.01)

(52) U.S. Cl.
CPC ......... *H04N 9/3185* (2013.01); *G03B 21/005* (2013.01); *H04N 2005/4428* (2013.01)

(56) References Cited

U.S. PATENT DOCUMENTS

| | | | |
|---|---|---|---|
| 6,592,228 B1* | 7/2003 | Kawashima | G03B 21/11 348/745 |
| 7,675,542 B2* | 3/2010 | He | H04N 5/23203 348/135 |
| 7,738,082 B1* | 6/2010 | Peters | G01C 3/22 356/4.01 |
| 8,451,381 B2* | 5/2013 | Kaise | H04N 5/44513 348/580 |
| 8,898,005 B2* | 11/2014 | Mizuno | G01C 21/26 701/409 |
| 9,146,666 B2* | 9/2015 | Gibbs | G06F 3/0488 |
| 2005/0128437 A1* | 6/2005 | Pingali | H04N 9/3194 353/69 |
| 2005/0151934 A1* | 7/2005 | Akutsu | H04N 9/3102 353/69 |
| 2006/0125968 A1 | 6/2006 | Yokozawa et al. | |
| 2011/0120218 A1* | 5/2011 | Aldridge | G01F 23/292 73/290 R |
| 2013/0027672 A1 | 1/2013 | Ehara | |
| 2014/0039674 A1* | 2/2014 | Motoyama | G03B 21/142 700/245 |
| 2015/0204976 A1* | 7/2015 | Bosch | G01B 11/26 356/4.01 |

FOREIGN PATENT DOCUMENTS

| | | |
|---|---|---|
| CN | 102905099 A | 1/2013 |
| CN | 103956036 A | 7/2014 |
| EP | 1153334 A1 | 11/2001 |
| JP | 2002-162690 | 6/2002 |
| JP | 2008-092002 | 4/2008 |
| JP | 2010-283449 | 12/2010 |
| JP | 2011-232416 | 11/2011 |
| WO | WO-01/48551 A1 | 7/2001 |

OTHER PUBLICATIONS

Chinese Office Action dated Mar. 24, 2017 issued in corresponding Chinese Application No. 201510881372.4.

* cited by examiner

| PROJECTION SCREEN SIZE | PROJECTION DISTANCE a | PROJECTION HEIGHT b |
|---|---|---|
| 48 INCH | 12 cm | 9 cm |
| 60 INCH | 17 cm | 12 cm |
| 80 INCH | 25 cm | 16 cm |

PROJECTION DISPLAY SYSTEM, AND REMOTE CONTROLLER FOR CONTROLLING PROJECTOR

CROSS-REFERENCE TO RELATED APPLICATIONS

This patent application is based on and claims priority pursuant to 35 U.S.C. §119(a) to Japanese Patent Application No. 2014-250380, filed on Dec. 10, 2014, in the Japan Patent Office, the entire disclosure of which is hereby incorporated by reference herein.

BACKGROUND

Technical Field

The present invention relates to a projection display system, and specifically relates to a remote controller for assisting positioning of a projector.

Description of the Related Art

In recent years, a wide-angle projection video display device has come into use. This is a projection display system (projector system) that uses a reflective mirror for a refractive lens to use the mirror's high reflection refractive power and accordingly can obtain a large screen at a short distance with a wide-angle projection lens. In the specification, the entire projector system including not only the projector body but also accessories is referred to as the "projection display system."

In such a projection display system, subtle changes in installation position and installation angle of the projector with respect to a projection surface such as a screen bring about a significant change in screen size. JP-2011-232416-A discloses a technology that can uniquely set a projection distance with a simple mechanism, and further minimize horizontal distortion.

In JP-2011-232416-A, a projection distance setting unit is included. The projection distance setting unit determines a space between a projection surface and a projector (a projection distance). However, in this method, if the projection surface is located higher than the projector as in a screen hanging down from the ceiling, a projection distance setting mechanism being an abutment provided to the projector cannot come into contact with the projection surface.

SUMMARY

Example embodiments of the present invention include a projection display system includes a projector to project an image onto a projection surface, and a remote controller to control the projector. The remote controller includes a first sensor to measure a current value of horizontal distance to the projection surface, a second sensor to measure a current value of vertical distance to the projection surface, and a processor to obtain, from a memory, preset values of horizontal distance and vertical distance corresponding to a screen size selected by a user, and to control a display to display a screen including the obtained preset values of horizontal distance and vertical distance, the current value of horizontal distance measured by the first sensor, and the current value of vertical distance measured by the second sensor.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The invention disclosed in the following embodiment has the following features when an installation position for projection at a desired screen size is determined in a projection display system.

In short, the features are as follows: a remote controller is equipped with proximity sensors so that the distance between the remote controller and a screen can be easily measured at low cost; a projector body is installed below the remote controller so that the distance between the remote controller and the projector body can also be measured, the installation position necessary for projection at a screen size desired by a user can be calculated from this distance and the distance to the screen, the installation position obtained by the calculation can be easily found by the remote controller, and the projector body can be installed relative to the position.

The above-described features of the present invention are described in detail with reference to the drawings.

Firstly, an outline of the projection display system according to the background art is described with reference to FIG. 1.

Figure 1:
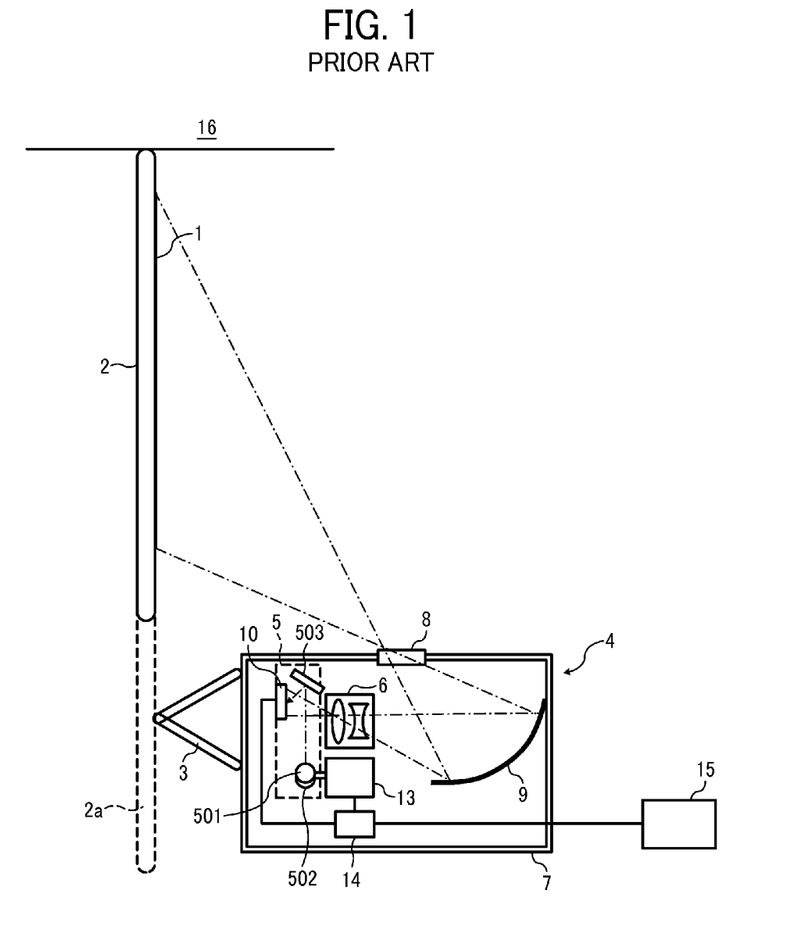
FIG. 1 is a diagram for explaining a conventional projection display system.

FIG. 1 is a diagram illustrating an entire system configuration of the projection display system, and is a cross-sectional view as viewed from a lateral direction parallel to a projection surface. The projection surface is assumed to be a screen hanging down from above, such as from the ceiling.

The projection display system illustrated in FIG. 1 includes an external input device 15, a projector 4, and a screen 2. The projector 4 projects and displays, on a projection surface 1 of the screen 2, an image formed in accordance with image information input from the external input device 15. For example, a personal computer can be used as the external input device 15. The projector 4 is a projector of a type called a single focus projector or wide-angle projection video display device.

The projector 4 includes, inside a case 7, an interface 14, a controller 13, an image forming unit 10, an illuminating optical system 5, a first optical system 6, and a second optical system 9. The interface 14 receives a signal from the external input device 15. The controller 13 processes image information received from the interface 14. The illuminating optical system 5 guides light from a light source 501 and a color filter 502 to the image forming unit 10. The image forming unit 10 forms an image in accordance with the processing of the controller 13.

A projection optical system of the projector 4 includes the first optical system 6 and the second optical system (mirror) 9 to enlarge and project the image formed by the image forming unit 10 by use of the optical systems. The case 7 holds these components and optical systems collectively, and covers them. An opening 8 is provided on the top of the case 7. Light projected from the projection optical system is displayed on the screen 2 through the opening 8.

The projection display system of FIG. 1 projects an image with such a mechanism. Accordingly, the size of the projection surface 1 is determined by the distance between the screen 2 and the projector 4. A projection distance setting unit 3 illustrated in FIG. 1 is placed on the projection side of the projector 4 to correctly set the distance between the screen 2 and the projector 4. The projection distance setting unit 3 is installed between the projection surface 1 and the projector 4 to determine the space between the projection surface 1 and the projector 4 (a projection distance).

The projection distance setting unit 3 can determine the projection distance suitably if the screen 2 hanging down from a ceiling 16 is also located at a position "2a" indicated by a broken line in FIG. 1. However, if the screen 2 is not at the position "2a," there is no surface to come into contact with the projection distance setting unit 3. Accordingly, the projection distance cannot be determined, and installation in accordance with a desired screen size cannot be performed, using the projection distance setting unit 3.

In view of the above, the inventor of the present invention has discovered that there is a need for a projection display system capable of installing the image projector at a right position in accordance with a desired screen size even in such an environment.

Figure 2:
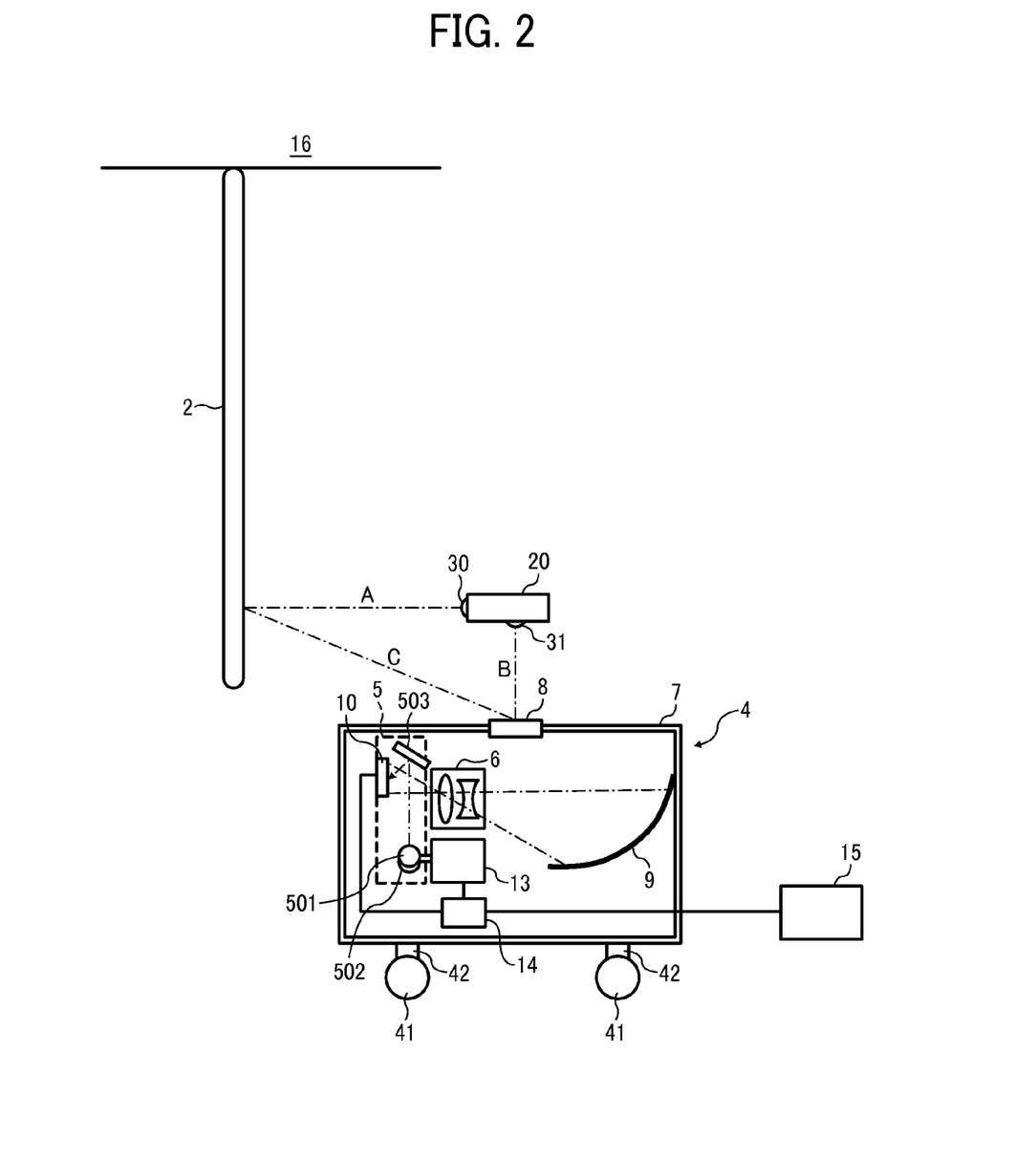
FIG. 2 is a schematic configuration diagram according to an embodiment of the present invention.

As illustrated in FIG. 2, the projection display system of the embodiment includes, in the projector 4, an installation position adjustor 41 to adjust the installation position of the projector 4. The installation position is a position of the projector 4 relative to the projection surface 1 or the screen 2, and may be indicated by the distance between a flat surface such as the projection surface 1 and the projector 4. Moreover, the installation position may be indicated by an installation angle. Specific examples of the installation position adjustor 41 include a caster and a roller.

Moreover, the projection display system of the embodiment includes, in the projector 4, a vertical position adjustor 42 to adjust the vertical position of the projector 4. Specific examples of the vertical position adjustor 42 include any structure capable of finely adjusting the distance from the floor surface to the opening 8 of the projector 4 with, for example, a screw.

Moreover, the projection display system of the embodiment includes a remote controller 20. The remote controller 20 includes a proximity sensor 30 for measuring a distance A to the screen 2, and a proximity sensor 31 for measuring a distance B to the projector 4. In this embodiment, the remote controller 20 is provided with a switch to turn on or off the projector 4 using infrared radiation, and a key to allow a user to select from a menu.

In order to determine the installation position of the projector 4, it is necessary to determine the projection distance, that is, the distance between the screen 2 and the projector 4. In order to determine the projection distance using the image projector of FIG. 2, firstly, the proximity sensor 30 is used to measure the distance A between the remote controller 20 and the screen 2 (the distance to the screen).

Next, installation is performed in such a manner as to locate the opening 8 of the projector 4 directly below the remote controller 20. The distance B between the remote controller 20 and the projector 4 (a projector distance) is then measured by the proximity sensor 31. From the distance A to the screen and the projector distance B, a projection distance C from the projector 4 to the screen 2 can be calculated by the following equation:

$$C=\sqrt{A^2+B^2}$$ [Equation 1]

When the projection distance to the projector is obtained, an installation position in accordance with a desired screen size can be found. A method for determining an installation position in accordance with a screen size is described with reference to FIGS. 3A and 3B.

Figure 3A:
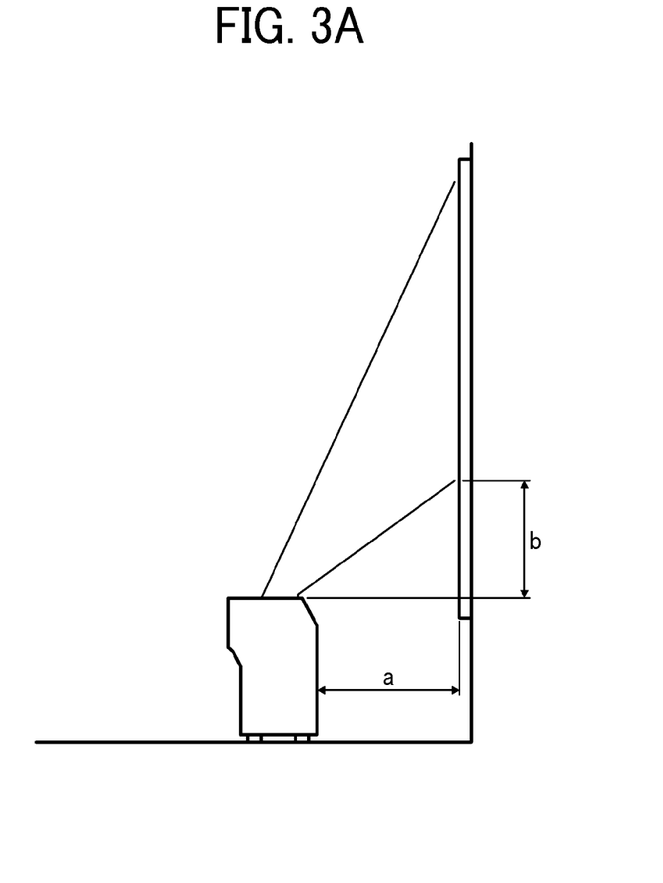
FIG. 3A is a diagram illustrating the relationship between a screen size and a projection distance according to the embodiment.
Figure 3B:
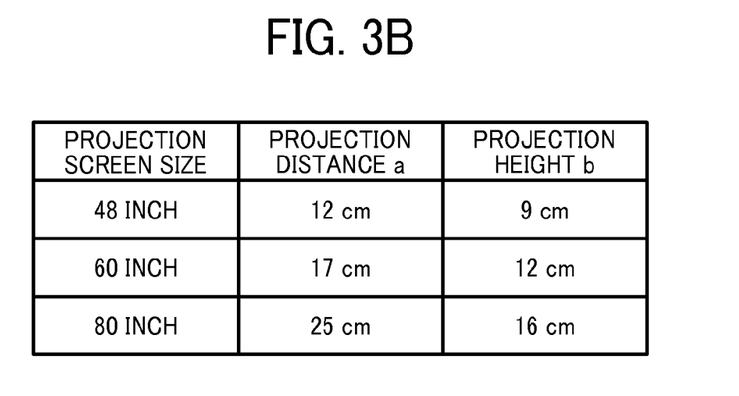
FIG. 3B is a table storing information indicating the relationship between the screen size and the projection distance.

FIG. 3A is a diagram illustrating the relationship between the screen size and the projection distance in a wide-angle projection video display device (a single focus projector) like the projection display system according to the embodiment. As in a table in FIG. 3B, the projection screen size is determined by a projection distance "a" and a projection height "b".

Numerical information on the projection screen size, and the projection distance and height is stored in advance in the remote controller 20 or memory of the projector 4 so that the numerical values can always be called up and used. Consequently, a location for installation upon installation adjustment can be found in advance. The memory is implemented as a random access memory (RAM) or the like to function as a storage of the projection display system. For example, any desired server may be provided in the projection display system in a manner accessible by the projector 4 or the remote controller 20. Alternatively, the memory may be an internal memory of the projector 4 or the remote controller 20.

Figure 4:
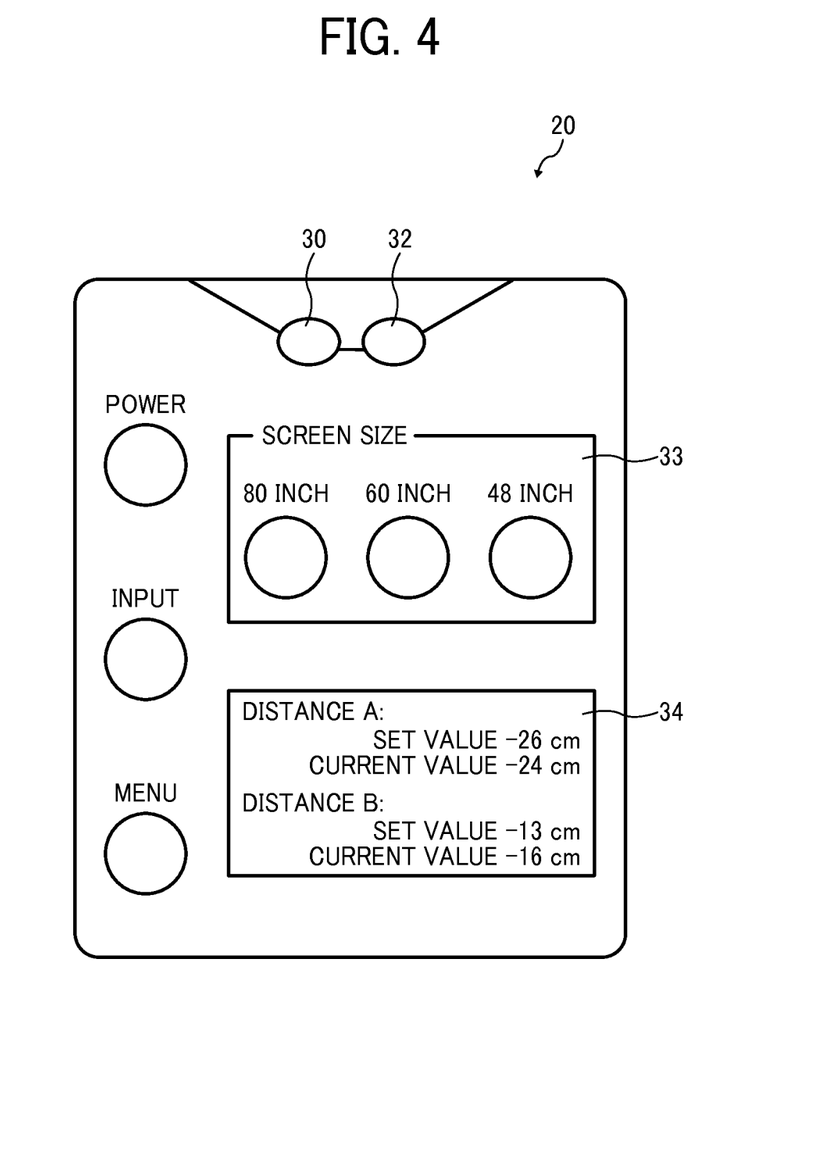
FIG. 4 is a diagram illustrating a user interface (UI) of a remote controller according to the embodiment.

Next, the configuration of the remote controller 20 is described. FIG. 4 is a diagram illustrating a user interface of the remote controller 20 according to the embodiment. As illustrated in FIG. 4, the remote controller 20 includes an infrared sensor 32 for operating the projector 4, and the proximity sensor 30 for the screen. The proximity sensor 31 for the projector is placed on the back of the user interface, and accordingly is not visible in FIG. 4.

Moreover, as illustrated in FIG. 4, the remote controller 20 includes a power key for operating power to the projector 4, an input key coupled to an input interface for switching an input signal, and a menu key for allowing a user to select to perform installation of the projector 4 through display information to be used for installation on the projection screen.

In addition to the above keys, the remote controller 20 may include screen size keys that allow the determination of the projection screen size (screen size select keys 33), which include 80-inch, 60-inch, and 48-inch in this example. The screen size select keys 33 can be freely modified, for example, to reflect the screen sizes that are frequently used. The remote controller 20 includes a liquid crystal display (LCD) panel 34 that presents the distance between the remote controller 20 and the screen 2. A position where the two distances, A and B, displayed on the LCD panel 34 match set values is the installation position of the projector 4.

Here, the LCD panel 34 is provided to the remote controller 20 to inform the user of the distances. In this case, the LCD panel 34 functions as a display. As another aspect, when the projector 4 has come to the installation position, the remote controller 20 may sound a beep to make a notification. In this case, a speaker or the like that sounds a beep operates as a notification unit. Moreover, the remote controller 20 may cause the projector 4 to project a projection image including installation position information to inform the user of the current position. In this case, the projector 4 functions as a display. Moreover, similarly, the remote controller 20 may control the projector 4 to display a message or sound a beep when the projector 4 has come to the installation position. In this case, the projector 4 functions as a notification unit. For example, the projector 4 may be provided with an interface, which receives a signal from the remote controller 20 that may be output when the current values match the set values.

In projecting the installation position information by the projector 4 in this manner, the remote controller 20 transmits information to be displayed to the projector 4 by radio. The projector 4 includes a wireless communication unit that can receive such information transmitted from the remote controller 20. Examples of such a wireless communication unit include a Bluetooth (registered trademark) transmitter/receiver.

The remote controller 20 further includes a central processing unit (CPU) and a memory. The CPU controls operation performed by the remote controller 20, such as operation of assisting positioning of the projector 4 as described below referring to FIG. 5, according to a control program stored in the memory. The memory may be any desired memory such as a RAM, for example.

Further, the remote controller 20 may store information regarding the preset values of the projection distances "a" and "b" (FIG. 3B) in its internal memory.

Figure 5:
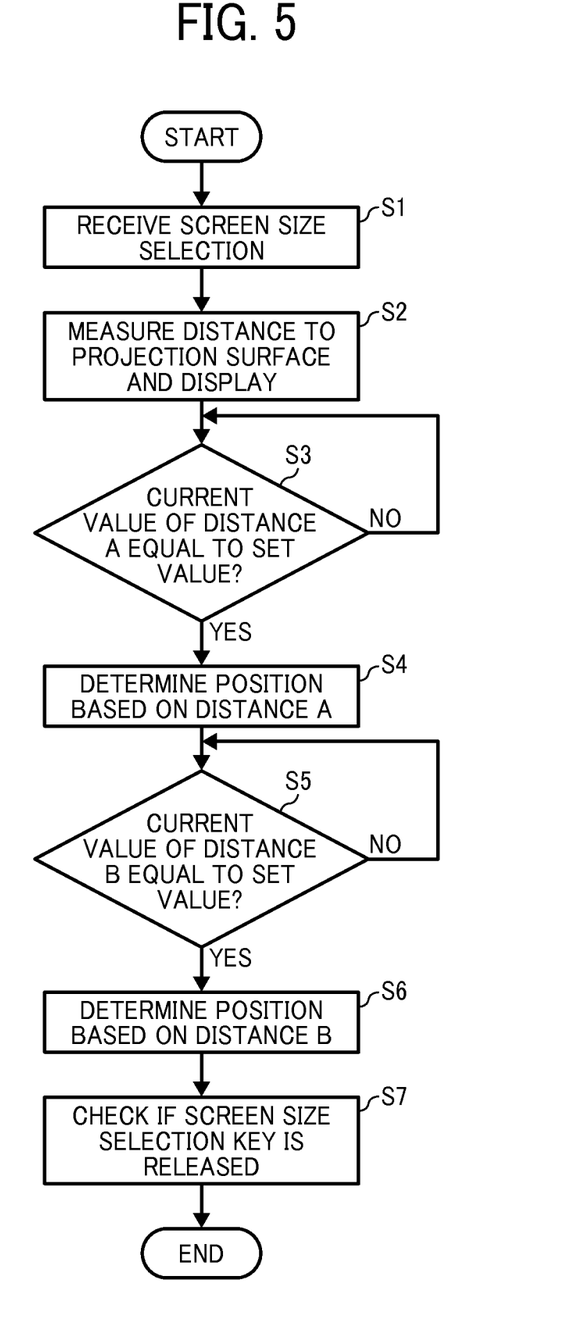
FIG. 5 is a flowchart illustrating operation of determining an installation position of a projector according to the embodiment.

Next, operation of determining the installation position of the projector 4 on the user's instruction with the remote controller 20 is described with reference to FIG. 5. FIG. 5 is a flowchart illustrating operation of determining the installation position of the projector 4 using the remote controller 20.

Firstly, the user selects any screen size key from the screen size select keys 33 of the remote controller 20. The remote controller 20 accepts the selection instruction on screen size in response to the user's press of the key (S1). If the power key is pressed without pressing any of the screen size select keys 33, the remote controller 20 does not measure the distance. When any of the screen size select keys 33 is being pressed, the remote controller 20 measures the distance to the screen 2 and displays the measured value as a current value on the LCD panel 34 (S2). As illustrated in FIG. 4, the distance A, the distance B, and their respective set values and current values are displayed.

The user adjusts the remote controller 20 back and forth toward the projection surface in such a manner to make the distance of the displayed current value the same as the set value. With the change of the position, the remote controller 20 determines whether or not the current value of the distance A is equal to the set value (S3). If the distance A is equal to the set value (YES in S3), the position in the distance A is determined (S4).

Next, the user places the opening 8 of the projector 4 directly below the remote controller 20. In other words, the position of the projector 4 is adjusted up and down in such a manner as that the current value of the distance B becomes the installation value indicated on the LCD panel 34. With the change of the position, the remote controller 20 determines whether or not the current value of the distance B is equal to the set value (S5). If the distance B is equal to the installation value (YES in S5), the position in the distance B is determined (S6). Since the distances A and B have been determined, the installation of the projector 4 is complete. Lastly, the remote controller 20 checks whether or not the screen size select key 33 has been released (S7) to end the process.

The remote controller 20 stops the measurement triggered by the user releasing the screen size select key 33 of the remote controller 20.

When the projector 4 is turned on to light a lamp, projection is performed at a screen size desired by the user. The projector 4 may be turned on to make the above installation adjustments with the lamp on.

In the above position adjustments, the user is required to make position adjustments, using the installation position adjustor 41, to place the opening 8 of the projector 4 directly below the remote controller 20. Moreover, the user is required to adjust the position of the projector 4 up and down, using the horizontal position adjustor 42, to make the distance B equal to the installation value indicated on the LCD panel 34.

With the procedure described with reference to FIG. 5, the projection display system of the embodiment can obtain an installation position and a vertical position of the projector 4, the positions being suitable to a screen size desired by the user. This effect is exhibited even if the projection surface 1 is located higher than the projector 4 as in a screen hanging down from the ceiling. According to the embodiment, the use of the remote controller 20 enables easy determination of the installation position of the projector 4's body and easy installation.

Even if a distance measuring sensor is mounted on the projector 4's body, measurement cannot be performed since the projector 4 is wide-angle, and its projection surface is located obliquely above it. Measurement can be performed if a camera is incorporated. However, a wide-angle camera is required, which is expensive. In addition, the installation position also needs to be located as backward as possible. Therefore, it affects the design of the projector 4. Accordingly, it is not preferable.

However, according to the configuration of the embodiment where the remote controller 20 is equipped with the proximity sensors 30 and 31, the cost is low and the distance between the remote controller 20 and the screen surface 1 can be easily measured. Moreover, the projector 4's body is installed below the remote controller 20. Accordingly, the distance between the remote controller 20 and the projector 4's body can also be measured. From this distance and the distance to the screen, an installation position necessary for projection at a screen size desired by the user can be calculated. The installation position obtained from the calculation can be easily found by the remote controller 20. The projector 4's body can be installed.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A projection display system, comprising:
 a projector configured to project an image onto a projection surface; and
 a remote controller configured to control the projector, the remote controller including,
   a first sensor configured to measure a current value of horizontal distance to the projection surface;
   a second sensor configured to measure a current value of vertical distance to the projector; and
   a processor configured to
     obtain, from a memory, preset values of horizontal distance and vertical distance corresponding to a user-selected screen size, the memory configured to store, for each one of a plurality of screen sizes, preset values of horizontal distance and vertical distance indicating a relationship of the projector with respect to the projection surface, and
     control a display to display a screen including the obtained preset values of horizontal distance and vertical distance corresponding to a user-selected screen size, the current value of horizontal distance, and the current value of vertical distance; and
   a wireless communication interface configured to transmit, to the projector, at least the current value of horizontal distance and the current value of vertical distance,
 wherein the projector is configured to project, onto the projection surface, the screen including the obtained preset values of horizontal distance and vertical distance corresponding to the user-selected screen size, and the current value of horizontal distance and the current value of vertical distance that are respectively transmitted by the wireless communication interface.

2. The projection display system of claim 1, wherein the remote controller is configured to generate a user-observable notification, based on a determination that the current value of horizontal distance measured by the first sensor and the current value of vertical distance measured by the second sensor respectively match the preset values of horizontal distance and vertical distance corresponding to the user-selected screen size.

3. The projection display system of claim 2, wherein the remote controller further includes the display configured to display the screen including the obtained preset values of horizontal distance and vertical distance, the current value of horizontal distance, and the current value of vertical distance.

4. The projection display system of claim 1, wherein the projector further includes the memory.

5. The projection display system of claim 1, wherein the projector is configured to generate a user-observable notification, based on a determination that the current value of horizontal distance and the current value of vertical distance respectively match the preset values of horizontal distance and vertical distance corresponding to the user-selected screen size.

6. The projection display system of claim 1, wherein the projector is configured to generate a user-observable notification based on receiving a signal from the remote controller.

7. A remote controller for assisting installation of a projector that is configured to projects an image on a projection surface, the remote controller comprising:
a first sensor configured to measure a current value of horizontal distance to the projection surface;
a second sensor configured to measure a current value of vertical distance to the projector;
a processor configured to
obtain, from a memory, preset values of horizontal distance and vertical distance corresponding to a user-selected screen size, the memory configured to store, for each one of a plurality of screen sizes, preset values of horizontal distance and vertical distance indicating a relationship of the projector with respect to the projection surface, and
control a display to display a screen including the obtained preset values of horizontal distance and vertical distance, the current value of horizontal distance measured by the first sensor, and the current value of vertical distance measured by the second sensor; and
a wireless communication interface configured to transmit, to the projector, at least the current value of horizontal distance measured by the first sensor and the current value of vertical distance measured by the second sensor, such that the remote controller is configured to cause the projector to project, onto the projection surface, the screen including the obtained preset values of horizontal distance and vertical distance corresponding to the user-selected screen size, and the current value of horizontal distance and the current value of vertical distance that are respectively transmitted by the wireless communication interface of the remote controller.

8. The remote controller of claim 7, wherein, the remote controller is configured to generate a user-observable notification, based on a determination that the current value of horizontal distance measured by the first sensor and the current value of vertical distance measured by the second sensor respectively match the preset values of horizontal distance and vertical distance corresponding to the user-selected screen size.

9. The remote controller of claim 8, wherein the remote controller further includes the display.

10. The remote controller of claim 7, wherein the processor is configured to cause the projector to generate a user-observable notification, based on a determination that the current value of horizontal distance measured by the first sensor and the current value of vertical distance measured by the second sensor respectively match the preset values of horizontal distance and vertical distance corresponding to the user-selected screen size.

11. The remote controller of claim 7, wherein the remote controller further includes the memory.

12. A non-transitory computer-readable storage medium storing a program of instructions executable by a computer system to cause the computer system to:
store, for each one of a plurality of screen sizes, preset values of horizontal distance and vertical distance indicating a relationship of a projection surface with respect to a projector configured to project an image on the projection surface;
receive, from a first sensor, a current value of horizontal distance to the projection surface;
receive, from a second sensor, a current value of vertical distance to the projector;
obtain preset values of horizontal distance and vertical distance corresponding to a user-selected screen size; and
transmit, to the projector, the obtained preset values of horizontal distance and vertical distance, the current value of horizontal distance measured by the first sensor, and the current value of vertical distance measured by the second sensor, such that the projector projects, onto the projection surface, a screen including the obtained preset values of horizontal distance and vertical distance corresponding to the user-selected screen size, the current value of horizontal distance, and the current value of vertical distance.

13. The non-transitory computer-readable storage medium of claim 12, wherein the program of instructions, when executed by the computer system, further causes the computer system to:
generate a user-observable notification, based on a determination that the current value of horizontal distance measured by the first sensor and the current value of vertical distance measured by the second sensor respectively match the obtained preset values of horizontal distance and vertical distance corresponding to the user-selected screen size.

14. The non-transitory computer-readable storage medium of claim 12, wherein the program of instructions, when executed by the computer system, further causes the computer system to:
display, on a local display of the computer system, the screen including the obtained preset values of horizontal distance and vertical distance, the current value of horizontal distance measured by the first sensor, and the current value of vertical distance measured by the second sensor.

15. The non-transitory computer-readable storage medium of claim 12, wherein the program of instructions, when executed by the computer system, further causes the computer system to:
cause the projector to generate a user-observable notification, based on a determination that the current value of horizontal distance measured by the first sensor and the current value of vertical distance measured by the second sensor respectively match the preset values of horizontal distance and vertical distance corresponding to the user-selected screen size.

* * * * *